Feb. 19, 1963    C. B. ASKE, JR    3,078,125
TIRE TRIM-WHEEL TRIM CONSTRUCTION
Filed Feb. 3, 1961    3 Sheets-Sheet 1
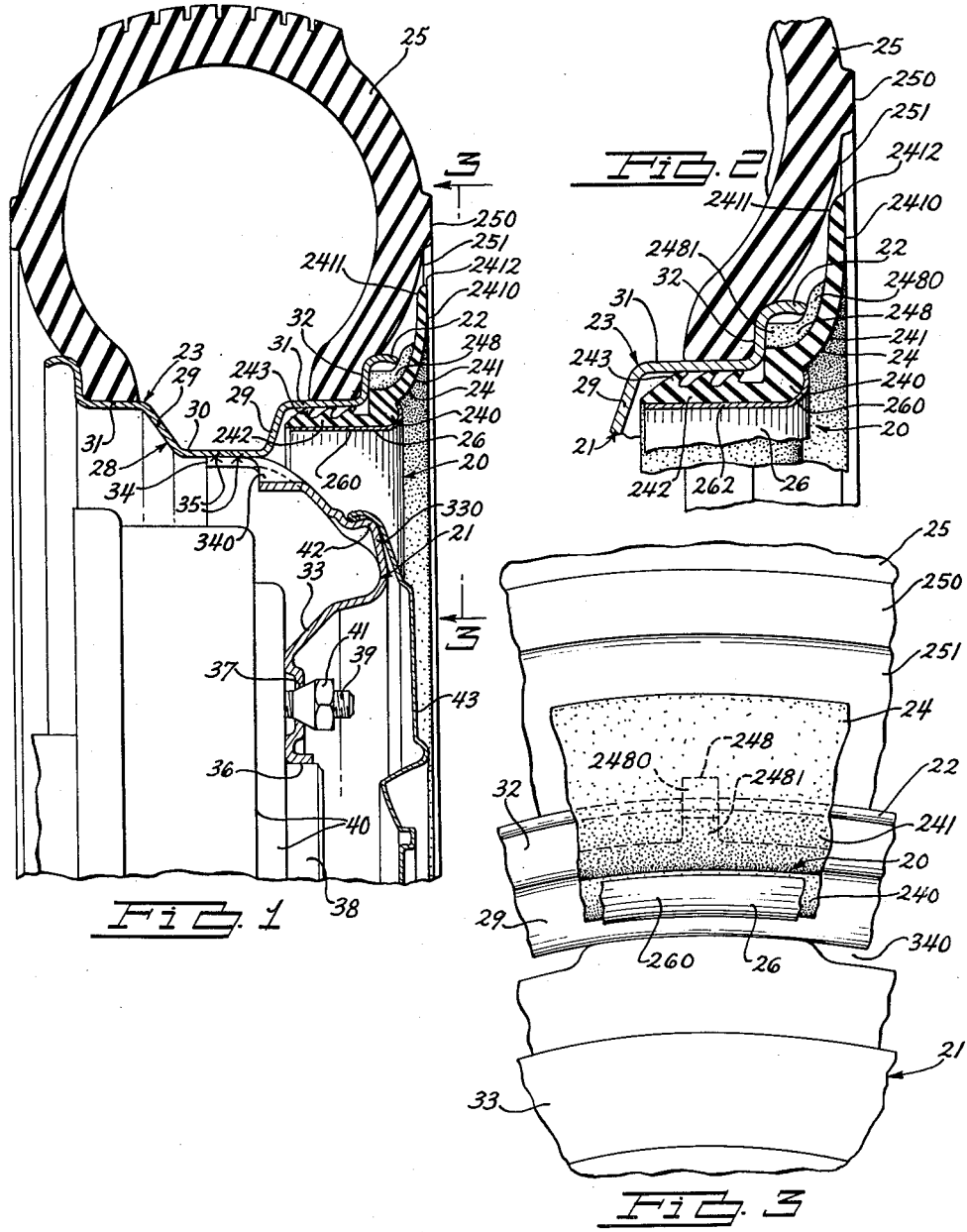
INVENTOR.
CHARLES B. ASKE, JR.
BY
ATTORNEY

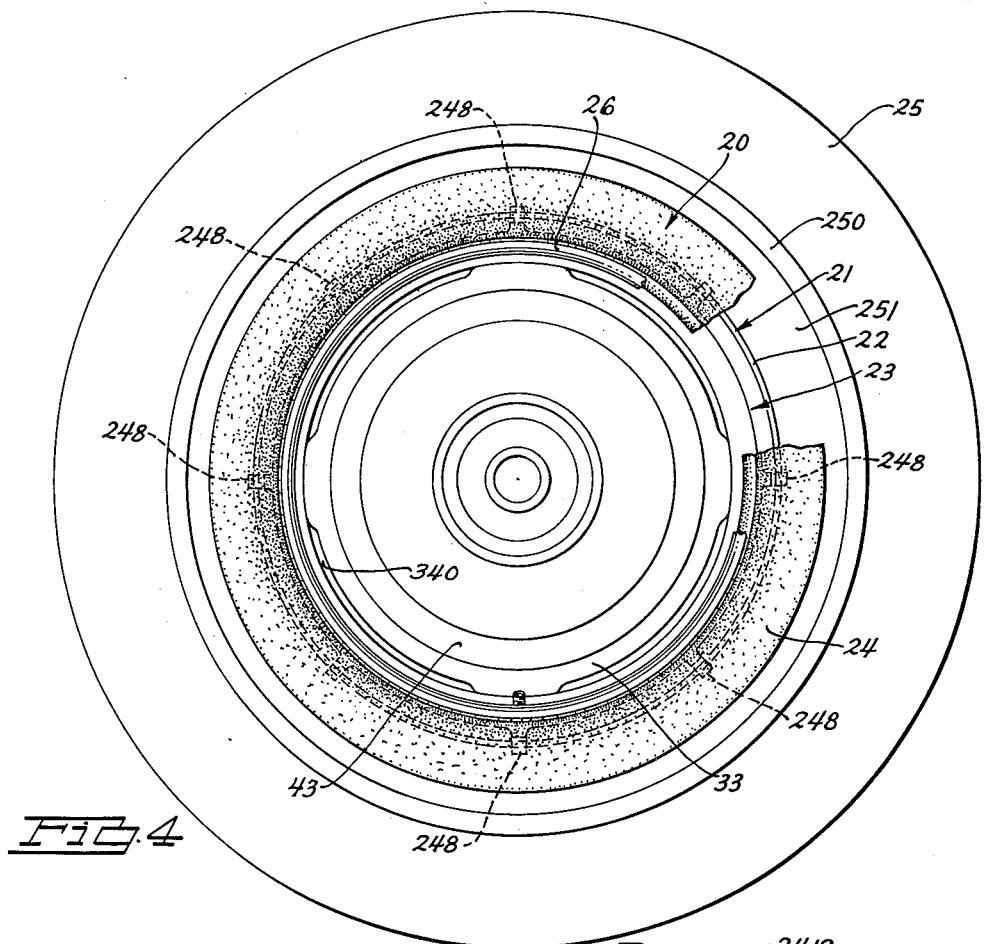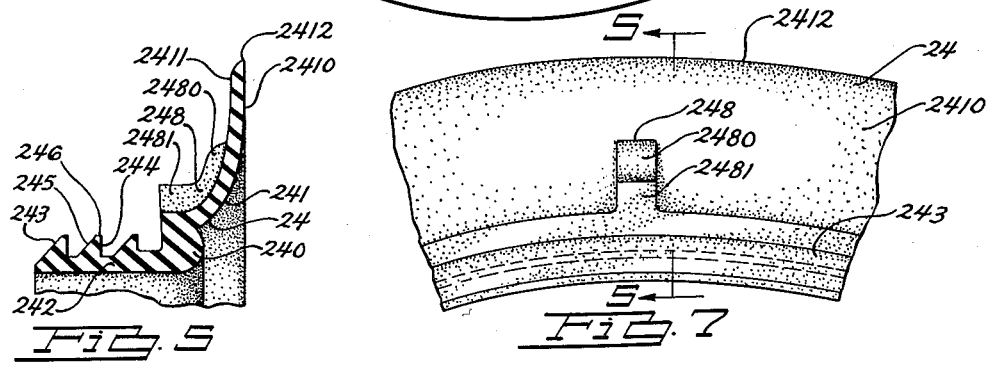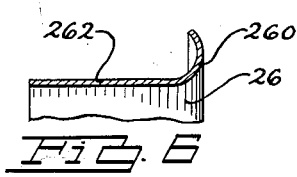

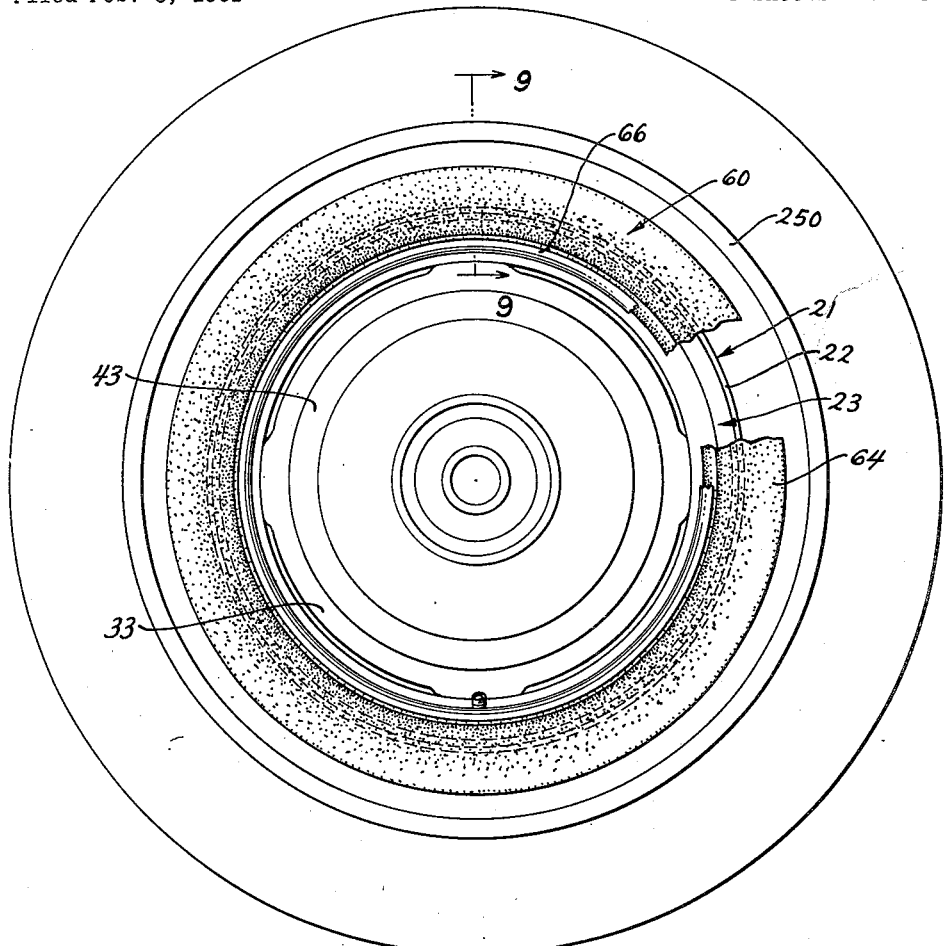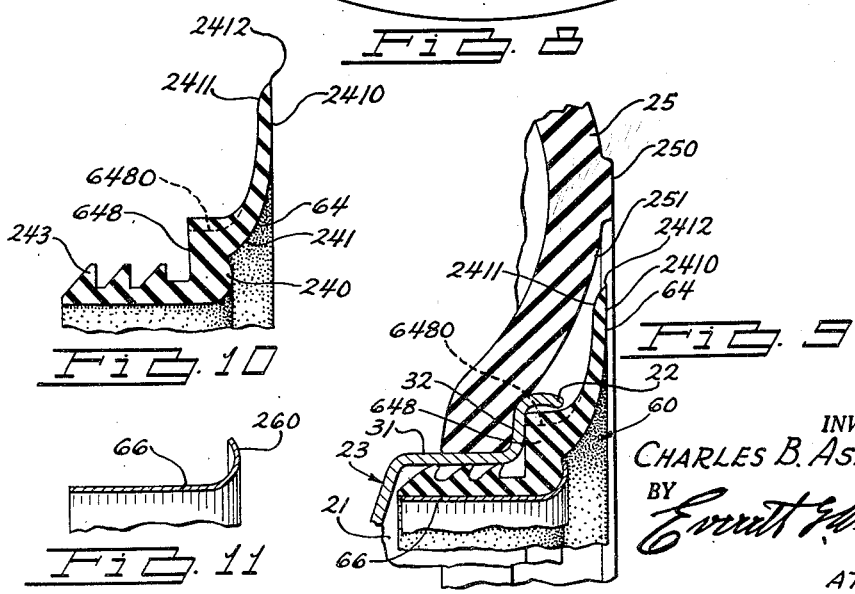

United States Patent Office 3,078,125
Patented Feb. 19, 1963

3,078,125
TIRE TRIM-WHEEL TRIM CONSTRUCTION
Charles B. Aske, Jr., Birmingham, Mich., assignor, by direct and mesne assignments, to Gar Wood Industries, Inc., a corporation of Michigan
Filed Feb. 3, 1961, Ser. No. 86,923
3 Claims. (Cl. 301—37)

This invention relates to vehicle tire trim and wheel trim, and in particular to improved and effective means for providing white or other colored side wall trim for black vehicle tires in conjunction with wheel trim.

The primary object of the present invention is to provide white or other colored trim for black wall tires wherein the tire trim is free standing in respect to the wall of the tire trimmed thereby, and the tire trim is combined with wheel trim for the purpose of being secured readily to a vehicle wheel, the said tire trim being gaged from the lip of the wheel rim or from the tire bead seat flange of the wheel rim to assure either no or only a relatively light intermittent contact by the wall of the tire whereby to prevent bleed-through of carbon black from the tire wall to the tire trim which normally would cause discoloration of the tire trim.

Another object of the invention is to provide wheel and tire trim construction for motor vehicle wheels wherein the tire trim is free standing with respect to the tire and only contactable by the wall of the tire under conditions of extreme tire bulging and then only lightly whereby to eliminate the frictional heat, frictional noises and wear of prior devices making it practicable to use either natural or synthetic rubbers in the tire trim element.

Other objects of the invention will become apparent by reference to the following detailed description taken in connection with the accompanying drawings, in which:

FIG. 1 is a vertical sectional view through the upper half of a vehicle wheel and tire equipped with the tire trim—wheel trim embodying the invention showing its relationship with respect to a typical modern vehicle wheel having a hub cap thereon, the said tire trim element being gaged on the outer lip of the wheel rim.

FIG. 2 is an enlarged fragmentary detailed sectional view of the tire trim—wheel trim disclosed in FIG. 1.

FIG. 3 is an enlarged fragmentary elevational view taken on the line 3—3 of FIG. 1.

FIG. 4 is a side elevational view of the tire trim—wheel trim element mounted on a vehicle wheel.

FIG. 5 is a cross sectional view of the tire trim element of the embodiment of the invention disclosed in FIGS. 1-4 inclusive taken on the line 5—5 of FIG. 7.

FIG. 6 is a cross sectional view of a wheel trim element that may be employed in the embodiment of the invention disclosed in FIGS. 1-4 inclusive.

FIG. 7 is a fragmentary rear elevational view of the tire trim element shown in FIG. 5.

FIG. 8 is a side elevational view similar to FIG. 4 showing an alternate embodiment of the invention with the tire trim gaged on the tire bead seat flange of the wheel rim.

FIG. 9 is an enlarged fragmentary detailed sectional view taken on the line 9—9 of FIG. 8.

FIG. 10 is a cross sectional view of the tire trim element of the embodiment of the invention disclosed in FIGS. 8-11 inclusive.

FIG. 11 is a cross sectional view of a wheel trim element that may be employed with the embodiment of the invention disclosed in FIGS. 8-11 inclusive.

Referring now to the drawings wherein like reference numerals refer to like and corresponding parts throughout the several views, the embodiment of the invention disclosed in FIGS. 1-7 inclusive consists of an improved automotive vehicle tire trim—wheel trim assembly 20 which is readily mounted on a vehicle wheel with the tire trim portion of the tire trim element disposed in free standing relationship with respect to the side wall of the tire mounted on the wheel rim, the said invention being disclosed in connection with a typical modern vehicle wheel 21 having a tubeless tire 25 mounted thereon.

The said vehicle wheel 21 has a drop center rim 23 composed of a central channel or drop center 28 having side walls 29 and a base 30. An annular tire bead seat 31 extends laterally outwardly from each side of the side walls 29 of the drop center 28, each said tire bead seat 31 terminating in a tire bead seat flange 32 extending upwardly therefrom which is curved axially outwardly at its upper portion to form an axially disposed outer lip 22. The said tire bead seat flange 32 is ofttimes referred to as the wheel flange and the said lip 22 is ofttimes referred to as the lip of the wheel rim. Within the drop center rim 23 is a wheel spider 33 having an axially disposed flange 34 which is secured to the central channel 28 of the drop center rim 23 by such means as welding at 35. The said wheel spider 33 is provided with a central hub aperture 36 with securing stud holes 37 spaced therearound to accommodate respectively the wheel hub 38 and wheel securing studs 39 extending from the brake drum 40 to which the wheel 21 is secured by means of the usual wheel securing nuts 41.

The flange 34 of the spider 33 is generally scalloped out and formed at 340 at intervals around the periphery thereof to provide brake drum ventilation and added structural strength to the vehicle wheel 21. The spider 33 is generally formed with an annular axially outwardly extending collar 330 which is preferably provided with a plurality of hub cap retainer nubs 42 over which a conventional hub cap 43 is sprung for securement onto the vehicle wheel 21. The said spider collar 330 has an annular exposed painted surface extending from the outer periphery of the hub cap 43 to the drop center wheel rim 23, which also has its exposed surfaces painted. The particular tire 25 illustrated in the drawings is a modern tubeless tire having a scuff bead 250 extending from its side wall 251. The said tubeless tire 25, when used on the vehicle wheel 21, requires a valve stem (not shown) which is usually mounted in sealed relationship through a valve stem aperature (not shown) provided in the outer wall 29 of the drop center rim channel 28 of the rim 23 of the said wheel 21.

The improved tire trim—wheel trim assembly 20 consists of two elements; namely, a tire trim element 24 preferably molded of relatively firm yet resilient live rubber or other suitable material such as butyl rubber, and a rim trim element 26 preferably formed of stainless steel or other relatively rigid material, which elements cooperate, not only to enhance and beautify the appearance of the vehicle wheel 21 and its tire 25, but also to removably secure the said wheel trim assembly 20 onto the vehicle wheel 21. The tire trim element 24 and the rim trim element 26 are assembled into a wheel trim—tire trim assembly 20 prior to mounting on the vehicle wheel 21.

The tire trim element 24 of the wheel trim 20 shown separately in FIGS. 5 and 7 preferably consists of an annular bead portion 240, an annular white or other colored side wall portion 241 extending radially outwardly from the said bead portion 240, and an annular anchorage flange portion 242 extending axially inwardly from said bead portion 240, the said annular anchorage flange portion 242 including a plurality of circumferential axially spaced teeth 243 disposed radially outwardly therefrom. The said side wall portion 241, in the instant embodiment of the invention, is formed so that its outer annulus 2410 is substantially radially disposed and free-standing in respect to the tire 25, and its outer periphery 2411 is spaced from the usually black side wall 251 of the tire 25. With such construction, the side wall portion 241 of the tire trim element 24 is only contacted very lightly by the lateral tire bulge when the tire 25 flexes upon road contact while a motor vehicle having its wheels equipped with tire trim—wheel trim 20 of the invention is either standing still or being driven.

It should be noted that the white or other colored side wall portion 241 of the tire trim element 24 is not molded in a form to flex against the side wall 251 of the tire 25, but is molded as shown in FIG. 5 to assume a free-standing attitude with respect to the tire wall 251 as best shown in FIGS. 1 and 2. To be assured that such free-standing attitude of the side wall portion 241 of the tire trim element 24 is maintained, a plurality of circumferentially spaced gage blocks 248 are molded on the rear thereof, the radial outer portion 2480 of the said gage blocks 248 being formed to contact and rest against the lip 22 of the wheel rim 23. The radial inner portion 2481 of each gage block 248 is formed to serve as a stop seat to properly locate the wheel trim assembly 20 when mounted on a vehicle wheel as hereinafter described. Any number of gage blocks 248 may be used, eight being shown in FIG. 4.

With the tire trim element 24 just described, the general objection to the use of butyl rubber for tire trim—wheel trim assemblies is overcome. In the prior art, when the side wall portion 241 of a tire trim element 24 was molded to flex at its outer peripheral portion against the side wall 251 of a tire 25, two things happened. First, the side wall portion of the prior art tire trim element gouged into the tire wall, and secondly, the movement between the side wall portion of the butyl rubber tire trim element and the tire wall caused a squeaking noise, which was disturbing. The instant improvement eliminates such conditions. Also, in the prior art, when the tire trim element was made of live rubber, although the squeaking was eliminated, the outer peripheral portion of the side wall of a white or light colored tire trim element discolored due to bleed through of carbon black from the black tire wall occasioned by combined friction and pressure between the outer peripheral portion of the side wall of the tire trim element and the side wall of the vehicle tire. This condition also is substantially eliminated by the instant invention.

The rim trim element 26 of the wheel trim 20 shown separately in FIG. 6 preferably consists of an outer annular bead or bull-nose portion 260 and an annular sleeve portion 262 extending axially inwardly from the said bull-nose portion 260. The said annular sleeve portion 262 may be suitably ornamented if desired by stamping or roll forming the blanks from which it is made. The said bull-nose portion 260 of the rim trim element 26 is formed to conform with the bead portion 240 of the tire trim element 24 when juxtaposed therewith when the annular anchorage flange portion 242 of the tire trim element 24 is telescoped over and assembled with the annular sleeve portion 262 of the rim trim element 26 to form the tire trim—wheel trim assembly 20 shown mounted on the vehicle wheel 21 in FIGS. 1 and 2. The rim trim element 26 is preferably roll formed from strip stock cut off to length and secured into a ring of the proper diameter by any suitable means such as by a lap or interlock joint, and/or by welding.

Each of the circumferential radially outwardly disposed teeth 243 of the annular anchorage flange portion 242 of the tire trim element 24 is preferably formed substantially triangular in cross section with a generally radially disposed axially outwardly facing wall 244 and an axially inwardly sloping wall 245. When the wheel trim assembly 20 is mounted axially onto a vehicle wheel 21 as hereinafter described, the said radially disposed axially outwardly facing circumferential teeth 243 of the anchorage flange portion 242 of the tire trim element 24 flex axially outwardly and radially inwardly into firm engagement with the radially inner annulus of the tire bead seat 31 of the wheel rim 23. The apex 246 of each of the said circumferential teeth 243 is preferably slightly truncated as shown in FIG. 5 so as to permit the circumferential teeth 244 to roll over from their locked position shown in FIGS. 1 and 2 to a position disposed axially inwardly when the said wheel tire trim—wheel trim assembly is forcibly removed axially from the vehicle wheel 21.

The tire trim element 24 and the rim trim element 26 of the wheel trim 20 are of such diameter in respect to each other that the anchorage flange portion 242 of the tire trim element 24 may be telescoped or otherwise firmly anchored in assembled relationship onto the sleeve portion 262 of the rim trim element 26 before mounting on the vehicle wheel 21. This, in effect, properly sizes the tire trim element 24 and maintains it in the correct annular form and size. When the tire trim element 24 and the wheel trim 20 are so assembled, the diameter of the apices 246 of the radially disposed axially outwardly facing teeth 243 is somewhat greater than the inner diameter of the annular tire bead seat 31 of the rim 23 of the vehicle wheel 21 so that, when the anchorage flange 242 of the tire trim element 24 and the sleeve portion 262 of the rim trim element 26 of the wheel trim assembly 20 are forcibly telescoped within the inner annulus of the tire bead seat 31 until the radial inner portion 2481 of each gage block 248 abuts the tire bead seat flange 32 of the wheel rim 23, the tire trim—wheel trim assembly 20 is firmly anchored in its proper mounted position on the vehicle wheel 21. When the tire trim—wheel trim assembly 20 is so mounted on the vehicle wheel 21 the radial outer portion 2480 of each said gage block 248 abuts the lip 22 of the wheel rim 23 and maintains the side wall portion 241 of the tire trim element 24 in its proper position as shown in FIGS. 1 and 2.

Vehicle wheel trim 20 embodying the invention in properly gaged by the gage blocks 248 extending axially inwardly of the side wall portion 241 of the tire trim element 24 to the wheel rim 23, both by the radial outer portion 2480 of the gage blocks 248 contacting the lip 22 of the wheel rim 23 and by the radial inner portion 2481 of the said gage blocks 248 contacting the tire bead seat flange 32, all of which not only assures perfect location of the vehicle wheel trim 20 on the vehicle wheel 20 but maintains the outer annular portion 2410 of the side wall 241 of the tire trim element of the said vehicle wheel trim 20 properly disposed and in free-standing relationship to the side wall 251 of the tire 25 where it is only contacted very lightly, if at all, by that portion of the vehicle tire that bulges laterally upon road contact. Thusly, the side wall 251 of the tire 25 is always completely air cooled and thereby excessive heat at the tire side wall 251 behind the side wall 241 of the tire trim element 24 is eliminated. It will be noted that the outer peripheral edge 2412 of the tire trim element 24 is so disposed as to never be contacted by the wall 251 of the tire 25 whereby to eliminate edge discoloration that otherwise might possibly occur when a very thin white or colored natural rubber element is frequently contacted by rubber containing a substantial amount of carbon black. The use of butyl rubber rather than natural rubber for the tire trim element 24 would withstand discoloration even if a relatively thin outer peripheral edge 2412 thereof were exposed to frequent contact by the wall 251 of the tire 25.

To remove the tire trim—wheel trim assembly 20 from the vehicle wheel 21, it is manually pried and/or pulled outwardly therefrom. A relatively large force is required to remove the said tire trim—wheel trim assembly 20 from the vehicle wheel 21 because of the necessity of initially flexing and rolling over the annular teeth 243 of the tire trim element 24 from their locked position best shown in FIG. 2 to their unlocked position with the apices of the said annular teeth 243 disposed axially inwardly. After the annular teeth 243 become so flexed, the complete removal of the tire trim—wheel trim assembly 20 is relatively easier than accomplishing the initial removal movement thereof from the vehicle wheel 21.

Referring now to the embodiment of the invention disclosed in FIGS. 8–11 inclusive, the tire trim—wheel trim assembly 60 shown therein includes a tire trim element 64 and a rim trim element 66 like and similar to the tire trim—wheel trim assembly 20 of FIGS. 1–7 inclusive except that the tire trim element 64 gages on the tire bead seat flange 32 only.

In the construction shown in FIGS. 8–11 inclusive, tire trim—wheel trim assembly 60 and its tire element 64 and rim trim element 66 that are the same or similar to the tire trim—wheel trim assembly 20 hereinbefore described; except, however, in the tire trim—wheel trim assembly 60, the tire trim element 64 is shown to employ a preferably continuous annular combined gage block and stop 648 rather than separately spaced gage blocks 248. It will be understood that the continuous gage block and stop 648 may be scalloped out or divided into a plurality of like but circumferentially spaced gage blocks if so desired whereby to form a plurality of wells indicated by dotted lines 6480 in FIG. 10 equally spaced around the outer periphery of the said gage block and stop 648 to provide space for wheel weights (not shown) to be secured at selected locations to the lip 22 of the wheel rim 23.

It should be noted that the combined annular gage block and stop 648 of the tire trim element 64 is formed to abut and rest against the tire bead seat flange 32 and extends radially substantially to the bottom of the lip 22 of the wheel rim 23, but preferably does not contact it. As best shown in FIG. 9, the said annular gage block and stop 648 serves as a stop when the tire trim—wheel trim assembly 60 is mounted on a vehicle wheel 21 to properly locate the same axially thereon, and also serves as a gage to maintain the substantially radially disposed outer annulus 2410 of the tire trim element 64 free-standing in respect to the tire 25 with its outer periphery 2411 spaced from the usually black side wall 251 of the tire 25. The said annular gage block and stop 648 is of such substantial mass that the necessity of gaging on the lip 22 of the wheel rim 23, the outer annulus 2410 of the side wall portion 241 of the tire trim element being supported in cantilever relationship from the gage block and stop 648.

The rim trim element 66 of the embodiment of the invention disclosed in FIGS. 8–11 inclusive, although shown to be plain and unornamented as the rim trim element 26 of the embodiment of the invention shown in FIGS. 1–7 inclusive, may be suitably ornamented by forming to provide a desirable reflective pattern.

It will be apparent that the tire trim—wheel trim assembly 20 disclosed in FIGS. 1–7 inclusive is particularly advantageous where the axial distance between the tire bead seat flange 32 and lip 22 of the wheel rim 23 is uniform in such circumstances as sales to car factories for installation on a standardized vehicle wheel. However, the tire trim—wheel trim assembly 60 disclosed in FIGS. 8–11 inclusive is particularly advantageous where the axial distance between the tire bead seat flange 32 and the lip 22 of the wheel rim 23 varies, as, for example, in after-market sales or in sales generally to automobile owners through car dealers and gas stations.

Although but two embodiments of the invention have been disclosed and described in detail herein, it is obvious that many changes may be made in the size, shape, arrangement and detail of the various elements thereof, all without departing from the spirit and scope of the invention as defined by the appended claims.

I claim:

1. In a wheel structure for vehicle wheels including a wheel rim having tire bead seats and tire bead seat flanges terminating in rim lips extending therefrom, and a tire mounted on said rim, a tire trim—wheel trim assembly consisting of an annular resilient tire trim element including an annular radially disposed side wall portion with an integral axially disposed circumferentially toothed anchorage flange portion, and an annular rim trim element telescopingly assembled within the anchorage flange portion of said tire trim element sizing the said tire trim—wheel trim assembly whereby to permit it to be telescopingly mounted on a vehicle wheel with the toothed anchorage flange portion thereof removably fixed in the axially outer tire bead seat of said wheel, said annular radially disposed side wall portion of said tire trim element being formed to be disposed in radially free-standing axially spaced relationship with respect to the side wall of said tire when said tire trim—wheel trim assembly is mounted on said wheel, the resilient annular radially disposed side wall portion of said tire trim element including gage block means on the axially inner side thereof formed to contact the wheel rim adjacent thereto whereby to gage and hold the side wall portion of the tire trim element in its radially free-standing axially spaced relationship from the side wall of said tire.

2. In a wheel structure for vehicle wheels including a wheel rim having tire bead seats and tire bead seat flanges terminating in rim lips extending therefrom, and a tire mounted on said rim, a tire trim—wheel trim assembly consisting of an annular resilient tire trim element including an annular radially disposed side wall portion with an integral axially disposed circumferentially toothed anchorage flange portion, and an annular rim trim element telescopingly assembled within the anchorage flange position of said tire trim element sizing the said tire trim—wheel trim assembly whereby to permit it to be telescopingly mounted on a vehicle wheel with the toothed anchorage flange portion thereof removably fixed in the axially outer tire bead seat of said wheel, said annular radially disposed side wall portion of said tire trim element being formed to be disposed in radially free-standing axially spaced relationship with respect to the side wall of said tire when said tire trim—wheel trim assembly is mounted on said wheel. The resilient annular radially disposed side wall portion of said tire trim element including gage block means on the axially inner side thereof formed to contact both the tire bead seat flange and the lip of the wheel rim adjacent thereto whereby to gage and hold the side wall portion of the tire trim element in its radially free-standing axially spaced relationship from the side wall of said tire.

3. In a wheel structure for vehicle wheels including a wheel rim having tire bead seats and tire bead seat flanges terminating in rim lips extending therefrom, and a tire mounted on said rim, a tire trim—wheel trim assembly consisting of an annular resilient tire trim element including an annular radially disposed side wall portion with an integral axially disposed circumferentially toothed anchorage flange portion, and an annular rim trim element telescopingly assembled within the anchorage flange portion of said tire trim element sizing the said tire trim—wheel trim assembly whereby to permit it to be telescopingly mounted on a vehicle wheel with the toothed anchorage flange portion thereof removably fixed in the axially outer tire bead seat of said wheel, said annular radially disposed side wall portion of said tire trim element being formed to be disposed in radially free-standing axially spaced relationship with respect to the side wall of said tire when said tire trim—wheel trim assembly is mounted on said wheel, the resilient annular radially disposed side wall portion of said tire trim element including circumferentially spaced axially disposed gage block means on the axially inner side thereof formed to contact the axially extending peripheral lip of the wheel rim adjacent thereto whereby to gage and hold the side wall portion of the tire trim element in its radially free-standing axially spaced relationship from the side wall of said tire.

References Cited in the file of this patent

UNITED STATES PATENTS

| | | |
|---|---|---|
| 2,386,235 | Lyon | Oct. 9, 1945 |
| 2,903,300 | Hurd | Sept. 8, 1959 |
| 2,915,335 | Barnes | Dec. 1, 1959 |
| 2,963,325 | Aske et al. | Dec. 6, 1960 |

FOREIGN PATENTS

| | | |
|---|---|---|
| 1,061,278 | France | Nov. 25, 1953 |
| 1,172,247 | France | Oct. 13, 1958 |